(12) United States Patent
Yoo (10) Patent No.: US 12,525,337 B2
(45) Date of Patent: Jan. 13, 2026

(54) METHOD AND APPARATUS FOR SELECTING MEDICAL DATA FOR ANNOTATION

(71) Applicant: Lunit Inc., Seoul (KR)

(72) Inventor: Donggeun Yoo, Seoul (KR)

(73) Assignee: LUNIT INC., Seoul (KR)

( * ) Notice: Subject to any disclaimer, the term of this patent is extended or adjusted under 35 U.S.C. 154(b) by 245 days.

(21) Appl. No.: 18/105,312

(22) Filed: Feb. 3, 2023

(65) Prior Publication Data

US 2023/0253098 A1 Aug. 10, 2023

(30) Foreign Application Priority Data

Feb. 9, 2022 (KR) .................. 10-2022-0016673
Jan. 26, 2023 (KR) .................. 10-2023-0010383

(51) Int. Cl.
*G16H 30/40* (2018.01)
*G16H 50/70* (2018.01)

(52) U.S. Cl.
CPC ............. *G16H 30/40* (2018.01); *G16H 50/70* (2018.01)

(58) Field of Classification Search
CPC ........ G16H 30/40; G16H 50/20; G16H 50/30; G16H 50/70; G06N 3/08; G06N 5/045; A61B 5/00; G06F 16/58
USPC ....................................................... 705/2, 3
See application file for complete search history.

(56) References Cited

U.S. PATENT DOCUMENTS

| | | | |
|---|---|---|---|
| 7,844,567 B2 | 11/2010 | He et al. | |
| 10,650,520 B1 * | 5/2020 | Beck ...................... | G16H 50/20 |
| 10,796,244 B2 | 10/2020 | Cheng et al. | |
| 2016/0171682 A1 * | 6/2016 | Abedini ................. | G16H 30/20 |
| | | | 382/132 |
| 2018/0300576 A1 | 10/2018 | Dalyac et al. | |
| 2020/0286614 A1 | 9/2020 | Do | |

(Continued)

FOREIGN PATENT DOCUMENTS

| | | |
|---|---|---|
| JP | 2020-101968 | 7/2020 |
| KR | 10-2019-0106861 | 9/2019 |

(Continued)

OTHER PUBLICATIONS

Brendon Lutnick et al: "Iterative annotation to ease neural network training: Specialized machine learning in medical image analysis", arxiv.org, Cornell University Library, 201 OLIN Library Cornell University Ithaca, NY 14853, Dec. 18, 2018 (Dec. 18, 2018), XP081000774, DOI: 10.1038/S42256-019-0018-3.

(Continued)

*Primary Examiner* — Alaaeldin M. Elshaer
(74) *Attorney, Agent, or Firm* — LEX IP MEISTER, PLLC (57) ABSTRACT

An operating method of a medical data selecting apparatus operated by at least one processor includes generating training data including partial medical data sampled from mass medical data and annotated data of the partial medical data, extracting candidate data for annotation from the mass medical data, the candidate data being at least a portion of the mass medical data, acquiring inference results that are inferred from the candidate data by an artificial intelligence (AI) model trained based on the training data and selecting target data for annotation to be used in next training of the AI model, from among the candidate data based on the inference results.

18 Claims, 9 Drawing Sheets

(56) References Cited

U.S. PATENT DOCUMENTS

| | | |
|---|---|---|
| 2021/0034920 A1 | 2/2021 | Edgar et al. |
| 2021/0035015 A1* | 2/2021 | Edgar .................. G06F 18/211 |
| 2021/0182622 A1* | 6/2021 | Peng .................. G06F 18/2155 |
| 2023/0096522 A1* | 3/2023 | Georgiev ............... G16H 30/40 |
| | | 382/128 |
| 2024/0112450 A1* | 4/2024 | Shintani ............. G06V 10/7753 |

FOREIGN PATENT DOCUMENTS

| | | |
|---|---|---|
| KR | 10-2019-0135329 | 12/2019 |
| KR | 10-2020-0054121 | 5/2020 |
| KR | 10-2261556 | 6/2021 |

OTHER PUBLICATIONS

EPO, Search Report of EP 23155596.2 dated Jun. 27, 2023.

\* cited by examiner

METHOD AND APPARATUS FOR SELECTING MEDICAL DATA FOR ANNOTATION

CROSS-REFERENCE TO RELATED APPLICATION

This application claims priority to and the benefit of Korean Patent Applications No. 10-2022-0016673 filed in the Korean Intellectual Property Office on Feb. 9, 2022, and No. 10-2023-0010383 filed in the Korean Intellectual Property Office on Jan. 26, 2023, the entire contents of which are incorporated herein by reference.

BACKGROUND

(a) Field

The present invention relates to annotation.

(b) Description of the Related Art

An artificial intelligence (AI) model may be trained based on mass medical images and their annotated data. Annotation involves tagging required information or tagged data in order to generate training data for an AI model. In particular, for medical data, annotation requires a skilled expert, resulting in significant costs and time.

Training performance may be improved with an increase in annotated data. However, due to the annotation budget limitations, selecting an annotation target from all medical data is necessary. Usually, some data randomly extracted from the entire medical data may not be optimal data for training of an AI model.

SUMMARY

The present invention provides a method and apparatus for selecting medical data for annotation.

The present invention has also been made in an effort to provide a method and apparatus for selecting medical data for annotation from mass medical data by determining a selection policy of medical data based on current training performance of an artificial intelligence (AI) model and selecting annotation target data to be used in next training according to the selection policy.

An exemplary embodiment of the present invention provides an operating method of a medical data selecting apparatus operated by at least one processor, comprising: generating training data including partial medical data sampled from mass medical data and annotated data of the partial medical data; extracting candidate data for annotation from the mass medical data, the candidate data being at least a portion of the mass medical data; acquiring inference results that are inferred from the candidate data by an artificial intelligence (AI) model trained based on the training data; and selecting target data for annotation to be used in next training of the AI model, from among the candidate data based on the inference results.

The selecting the target data for annotation may include: determining a selection policy for medical data to be used in the next training based on training performance of the AI model; and selecting the target data for annotation corresponding to the selection policy from among the candidate data based on the inference results.

The selection policy may include a policy of extracting medical data classified in a specific class more than medical data classified in other classes, the specific class having a classification accuracy equal to or lower than a reference.

The operating method may further include: extracting validation data from the mass medical data, the validation data being at least a portion of the mass medical data; and evaluating the training performance of the AI model based on the validation data.

The selecting the target data for annotation may include adding medical data randomly extracted from the mass medical data to the target data for annotation.

The selecting the target data for annotation may include: acquiring the inference results that are inferred from the candidate data by the AI model trained based on the training data; and selecting medical data related to a specific class from among the candidate data based on the inference results.

The generating the training data may include: analyzing a reading report associated with the mass medical data; sampling the partial medical data associated with the reading report including information related to training of the AI model; and acquiring the annotated data of the partial medical data to generate the training data.

The mass medical data may include images acquired by at least one medical imaging device, pathological images, or patch images extracted from a medical image.

Another embodiment of the present invention provides an operating method of a medical data selecting apparatus operated by at least one processor, comprising: repeating a process including: determining a selection policy for medical data based on training performance of a current artificial intelligence (AI) model, selecting annotation target data to be used in next training corresponding to the selection policy from among candidate data for annotation, based on inference results that are inferred from the candidate data by the current AI model, the candidate data being at least a portion of the mass medical data, and training the current AI model based on annotated data acquired for the annotation target data; and terminating the process when the next training of the current AI model is not performed.

The repeating may include: extracting validation data from the mass medical data, the validation data being at least a portion of the mass medical data; and evaluating the training performance of the current AI model based on the validation data.

The process may further include adding medical data randomly extracted from the mass medical data to the annotation target data.

The process may further include determining the selection policy to be a same as or different from a selection policy for previous training based on the training performance of the current AI model.

The current AI model may include an initial model trained based on partial medical data sampled from the mass medical data and annotated data of the partial medical data, or a model obtained by retraining the initial model based on the process.

The mass medical data may include images acquired by at least one medical imaging device, pathological images, or patch images extracted from a medical image.

Yet another embodiment of the present invention provides a medical data selecting apparatus operated by at least one processor, comprising: an artificial intelligence (AI) model trained to output an inference result that is inferred from an input based on training data; and a selector configured to: extract candidate data for annotation from mass medical data, the candidate data being at least a portion of mass medical data, acquire inference results that are inferred from the candidate data by the AI model, select annotation target data to be used in next training of the AI model from among the candidate data based on the inference results, and acquire annotated data of the annotation target data to be used in the next training of the AI model.

The selector may be further configured to repeat a process of selecting the annotation target data to be used in the next training based on the inference results of the AI model when the next training of the AI model is required.

The selector may be further configured to: determine a selection policy for medical data to be used the next training based on training performance of the AI model; and select the annotation target data corresponding to the selection policy from among the candidate data based on the inference results.

The selector may be further configured to determine the selection policy to be a same as or different from a selection policy for previous training based on the training performance of the AI model.

The selector may be further configured to add medical data randomly extracted from the mass medical data to the annotation target data.

The mass medical data may include images acquired by at least one medical imaging device, pathological images, or patch images extracted from a medical image.

According to the embodiment, it is possible to improve the trained AI model's performance while minimizing annotation cost by intelligently selecting annotation target data from among mass medical data.

According to the embodiment, the performance of the trained AI model may be improved rather than using training data being randomly extracted from entire medical data and annotated.

According to the embodiment, some patches requiring annotation may be selected from a large image, such as a pathological image, through whole slide imaging (WSI).

DETAILED DESCRIPTION OF THE EMBODIMENTS

Hereinafter, embodiments will be described in detail with reference to the accompanying tables and drawings such that they may be easily practiced by those skilled in the art to which the present invention pertains. As those skilled in the art would realize, the described embodiments may be modified in various different ways, all without departing from the spirit or scope of the present invention. In the accompanying drawings, a portion irrelevant to description of the present invention will be omitted for clarity. Like reference numerals refer to like elements throughout.

In addition, unless explicitly described to the contrary, the word "comprise", and variations, such as "comprises" or "comprising", will be understood to imply the inclusion of stated elements but not the exclusion of any other elements. In addition, the terms "-er", "-or", and "module" described in the specification mean units for processing at least one function and operation, and may be implemented by hardware components or software components, and combinations thereof.

In the present invention, terms including an ordinal number, such as 'first', 'second', etc. may be used to describe various components, but the components are not to be construed as being limited to the terms. The terms are only used to differentiate one component from other components.

The device of the present invention is a computing apparatus configured and connected so that at least one processor may perform operations of the present invention by executing instructions. The computer program includes instructions that are described for a processor to execute the operations of the present invention, and may be stored in a non-transitory computer readable storage medium. The computer program may be downloaded via a network or sold as a product.

Annotation may refer to an operation, such as representing information on target data or adding information to target data. Alternatively, annotation may refer annotated data represented on or added to the target data.

An expert who performs annotation job is called an annotator. Annotators may not necessarily be humans, but may be AI models that have learned an annotation operation.

Target data for annotation (annotation target data or annotation targets) may be various medical data, and a medical image may be described as an example. Medical images may be images captured by various medical imaging device, such as X-ray, magnetic resonance imaging (MRI), ultrasound, computed tomography (CT), mammography (MMG), and digital breast tomosynthesis (DBT) or may be pathological images. Pathological images may be acquired by whole slide imaging (WSI). Also, at least some patches of a medical image may be an annotation target.

Figure 1:
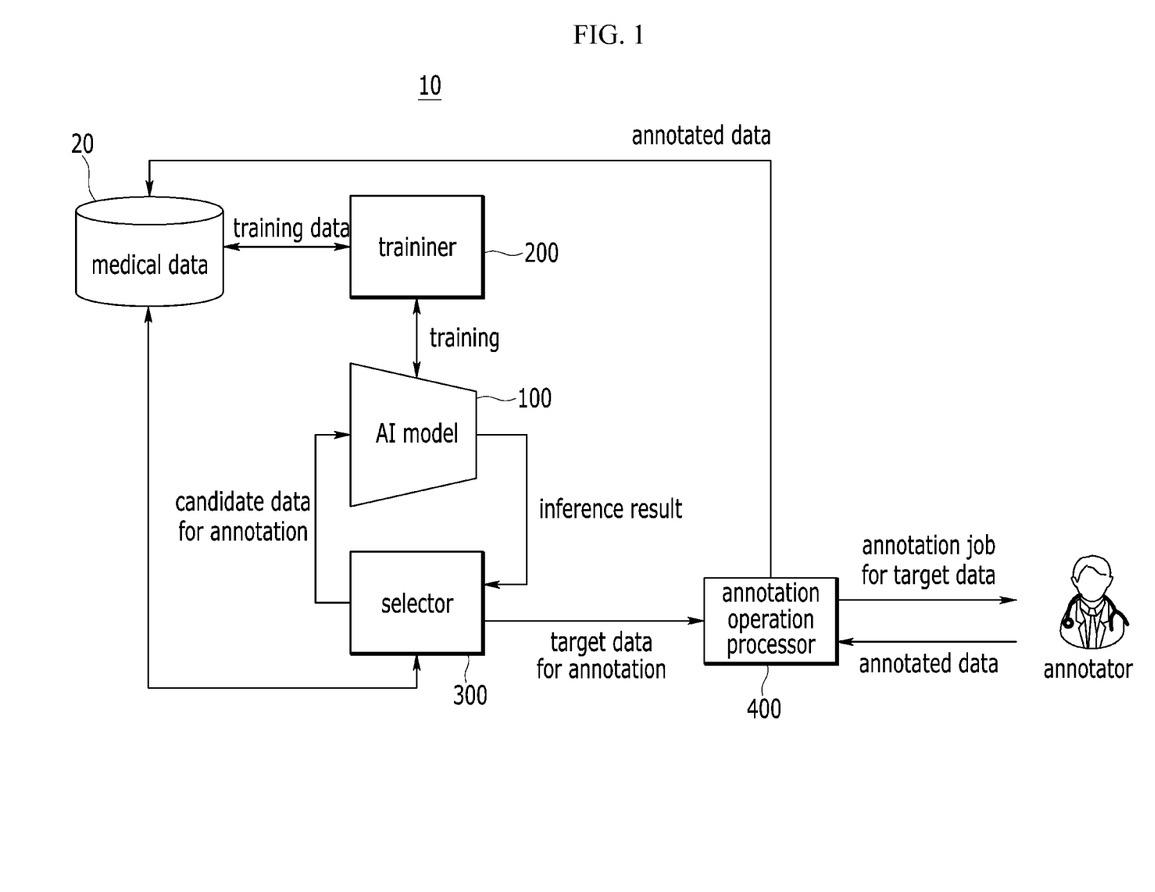
FIG. 1 is a diagram illustrating an apparatus for selecting medical data for annotation according to an exemplary embodiment.
Figure 2:
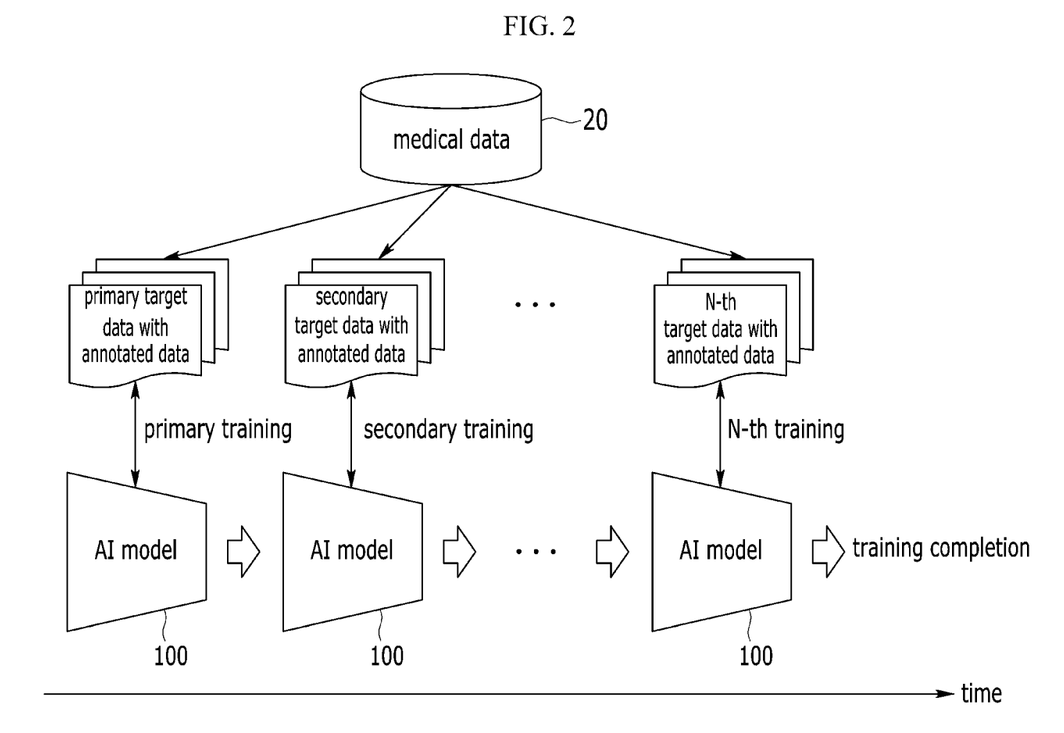
FIG. 2 is a diagram illustrating training selection of target data for annotation by stages according to an embodiment.

FIG. 1 is a diagram illustrating an apparatus for selecting medical data for annotation according to an embodiment, and FIG. 2 is a diagram illustrating training selection of target data for annotation by stages according to an embodiment.

Referring to FIG. 1, an apparatus for selecting medical data for annotation (simply, a selecting apparatus) 10 is a computing apparatus operated by at least one processor. The selecting apparatus 10 selects target data on which an annotation operation is to be performed for training of an AI model 100 in a database (DB) 20 having mass medical data. To improve AI model's training performance while minimizing annotation costs, the selecting apparatus 10 may determine a selection policy based on current performance of the AI model 100 and use the selection policy to select annotation target data for next training. Therefore, the selecting apparatus 10 may intelligently select target data for annotation from the mass medical data. The selection policy may include a selection condition and may further specify the amount of the target data to select. The selection policy may be determined as being the same as or different from a previous selection policy depending on the training performance of the current AI model.

The selecting apparatus 10 may include a trainer 200 training the AI model 100 and a selector 300 selecting target data for annotation which is used for the next training, from candidate data for annotation, based on an inference result of the current AI model 100. The selecting apparatus 10 may further include an annotation operation processor 400 that requests an annotation job for the target data to annotators and acquires annotated data for the target data. Annotated data for target data may be stored in the DB 20 and may be used as training data in the next training.

The DB 20 may include various types of medical data. Training data or candidate data for annotation may be determined in the DB 20 according to tasks of the AI model 100. The DB 20 may include images acquired by at least one medical imaging device, pathological images, or patch images extracted from each medical image.

The AI model 100 may be a machine learning model configured to learn at least one task, and may be implemented as a computer program executed by a processor. The task that the AI model learns may refer to a task to be solved or an operation to be performed through machine learning. The AI model may be implemented as a computer program running on a computing device, downloaded through a network, or sold as a product. Alternatively, the AI model may interwork with various devices through a network.

The AI model 100 may be designed to learn a relationship between an input and an output during a training process and outputs a result inferred from a new input. For example, the AI model 100 may be a model trained to receive a medical image and output medical inferences derived from the medical image. Medical inferences may be defined in various manners depending on inputs and tasks involved.

The AI model 100 may perform various tasks, such as detecting or separating biological objects like cells and tissues from medical images, or inferring specific information (e.g., immune phenotype (IP), combined positive score (CPS), tumor proportion score (TPS), expression level for a specific dye, response to a specific treatment, etc.) from medical images.

The AI model 100 may infer various information from the pathological image. For example, the AI model 100 may detect a biological object included in a pathological image. The AI model 100 may mark detected biological objects by drawing contours, bounding boxes, or dots in the center of all types of cells. The AI model 100 may segment a biological object included in the pathological image. The AI model 100 may recognize a region corresponding to a specific biological object in a pathological image in units of pixels. Here, the biological object may be cells, such as cancer cells, normal cells, mitosis cells, immune cells, and fibroblasts, and may include all biological objects, such as blood vessels, organs, nerves, cancer lesions, and tumor stroma. In addition, the AI model 100 may infer image quality information (for example, whether there is blur, whether a contaminant is present, whether a tissue is folded, etc.). The AI model 100 may infer whether the image includes a region of interest (ROI) (e.g., a cell region, a background region, a cancer region, etc.). The AI model 100 may infer immune-related information (e.g., immune phenotype classified into immune inflamed tumors, immune desert, immune excluded, etc.) from an image. The AI model 100 may infer a score, such as TPS or CPS of an image. The AI model 100 may infer an expression level of a specific dye (e.g., H&E, IHC, etc.) from an image. In order for the AI model 100 to perform these various inferences, medical data annotated with ground truths to be inferred should be used as training data. To this end, the selector 300 may select target data for annotation by determining which medical data to annotate will be helpful for training.

Similarly, the AI model 100 may infer various information from images acquired by medical imaging device, such as X-ray, CT, MMG, DBT, and so on. For example, the AI model 100 may classify an object in an image, draw a contour on a detected object, draw a bounding box on an object, or draw a dot in the center of an object, or classify a class in units of pixels. The AI model 100 may detect a line, such as an E-tube or an L-tube in an image, or calculate a probability corresponding to a class in units of pixels and display it as a heat map. Here, the class may be defined in various manners depending on information to be inferred from the image, and may be, for example, a lesion, such as pneumothorax, pulmonary nodule, lung cancer, tuberculosis, bone fracture, pneumonia, atelectasis, lung consolidation, the like, may be an organ, such as lung, stomach, esophagus, carina, diaphragm, or may be a medical device, such as an E-tube or L-tube. For another example, the AI model 100 may receive an image acquired by mammography, such as MMT or DBT, classify a lesion in the breast as a target object, or calculate breast density or the possibility of breast cancer occurring in the future. In order for the AI model 100 to perform these various inferences, medical images annotated with classes as ground truths should be used as training data.

The trainer 200 trains the AI model 100 based on training data. Training data may include medical data annotated with ground truth. The current training data may include target data selected for retraining of the AI model 100 trained with previous training data and annotated data thereof. During training with the current training data, the AI model 100 may learn to infer a result close to the annotated data, which serves as the ground truth, given an input. In this case, partial data of the training data with the annotated data may be used as validation data for evaluating training performance Depending on the learning method used, the AI model 100 may perform supervised learning by using medical data with annotated data or may learn by using medical data without annotated data as training data.

Meanwhile, the initial training data may include partially sampled data from mass medical data and annotated data thereof. For example, for initial training data, the selector 300 may sample 1000 medical images out of 100,000 medical images as annotation targets. Subsequently, the annotation operation processor 400 may acquire annotated data for 1000 medical images and store them in the DB 20, enabling the trainer 200 to use the 1000 medical images with the annotated data as initial training data.

There may be various methods to sample annotation targets for initial training data. For example, the selector 300 may randomly sample 1000 medical images from 100,000 medical images. Alternatively, the selector 300 may analyze a reading report associated with 100,000 medical images, and sample medical images including information (e.g., a class name for classification) related to training of the AI model 100. In addition, sampling methods may be various. Annotated data for predetermined medical images to be used as initial training data may be obtained without the need for sampling.

The AI model 100 trained with training data may output various inference results according to inputs and tasks. For example, the inference result may include a class representing a cell type included in the image, a class representing a tissue type included in the image, a class representing quality of the image or an artifact affecting the quality, a class representing whether a region in the image is an ROI, a class representing immunity-related information, a class representing scores, such as TPS or CPS, and a class representing an expression level of a specific dye. In addition, the inference result may be include a class representing a type of lesion (e.g., pneumothorax, pulmonary nodule, lung cancer, tuberculosis, fracture, pneumonia, atelectasis, pulmonary consolidation, benign tumor in the breast, malignant tumor in the breast, breast cancer lesion, etc.), a class representing a type of organ (e.g., lung, stomach, esophagus, carina, diaphragm, etc.), a class representing a type of medical device, a class representing breast density, or a class representing the possibility of developing breast cancer in the future.

The selector 300 selects annotation targets for next training from candidate data for annotation based on the training performance of the current AI model 100. The selector 300 may acquire training performance of the current AI model 100 and determine a selection policy based on the training performance to extract annotation targets for next training data. At this time, the selector 300 may determine the current selection policy as being the same as or different from a previous selection policy according to the training performance of the current AI model 100. That is, since the selector 300 determines a selection policy according to the training performance of the current AI model 100 and selects annotation targets for the next training data based on the selection policy, the current AI model 100 may re-train any insufficiently learned portions in previous training, during the next training.

The training performance of the current AI model 100 may be evaluated based on validation data remaining within the current training data used for training the AI model 100, or may be evaluated using data to which a ground truth is annotated in the mass medical data as validation data. The selector 300 may evaluate the training performance of the current AI model 100 by comparing the inference results inferred by the current AI model 100 on the verification data with the annotated ground truth of the the verification data. For example, when the current AI model 100 is a classification model, the selector 300 may evaluate training performance based on classification accuracy for each class. In addition, when classification accuracy of a specific class is below a reference, the selector 300 may determine a selection policy for extracting medical data related to the specific class so that the current AI model 100 may properly classify the specific class with poor classification accuracy in the next training.

In order to extract medical data related to the specific class and obtain an annotation later, an output value inferred by the AI model 100 may be used. For example, in order to extract medical data related to the class A according to the determined selection policy, the selector 300 may sort the medical data based on output values of the AI model 100 corresponding to the class A. The selector 300 may select medical data having an output value equal to or greater than a specific cut-off from the sorted medical data. By selecting the medical data having an output value equal to or greater than the specific cut-off, the selector 300 may select medical data having a relatively high probability of containing an object of class A or medical data being highly likely to corresponding to class A.

The selector 300 may use variously determined selection policies. For example, the selector 300 may use selection policy 1 that extracts medical data classified in a specific class more than medical data classified in other classes, the specific class having a classification accuracy equal to or lower than a reference. That is, in the selector 300, the selection policy 1 may include an optimal ratio of classes to be extracted to improve classification accuracy of the current AI model 100. The selector 300 may use selection policy 2 that extracts medical data having at least one class score higher than or equal to a reference from among candidate data for annotation. For example, in the selection policy 2, a class may represent at least one of a cell, tissue, or structure to be annotated, and a class score may refer to a probability of the entity belonging to the corresponding class. The selector 300 may use selection policy 3 that extracts medical data not including one or more classes from among candidate data. The selector 300 may use selection policy 4 that extracts medical data in which all defined classes are evenly distributed from among candidate data. The selector 300 may use selection policy 5 that extracts medical data having a higher entropy predicted by the AI model 100 than a reference from among candidate data. When the AI model 100 performs object detection or object separation, the selector 300 may use selection policy 6 that extracts medical data in which a ratio between classes satisfies a reference condition. The ratio between classes may vary according to the training performance and task of the current AI model 100. In the case of object detection, the ratio between classes may be set based on the number of objects (e.g., cells, etc.) for each class, and in the case of object separation, the ratio between classes may be set based on a width of an area of each class (e.g., cancer region, etc.). Also, the selector 300 may use a new selection policy that combines the multiple selection policies.

Based on the selection policy, the selector 300 may select annataion target data for the next training from candidate data. A selection policy may be determined according to training performance among various selection policies.

The selector 300 may acquire an inference result for candidate data by the AI model 100, and select medical data corresponding to a selection policy as target data for annotation based on the inference results of the candidate data.

The target data for annotation may be selected in units of images or in units of patches constituting an image. For example, when the candidate data is pathological images, the selector 300 may acquire inference results of the pathological images or a plurality of patches constituting each pathological image, and may determine pathological images or patches corresponding to the selection policy as target data for annotation based on the inference results. For example, since a pathological image generated through whole slide imaging (WSI) is very large, the selector 300 may extract patches corresponding to an ROI from at least one pathological image and extract the patches as candidate data for annotation. The selector 300 may extract patches so that the regions of interest overlap, or may extract patches so that the regions of interest do not overlap each other. The selector 300 may acquire inference results of the patches through the AI model 100 and select patches requiring annotation as annotation targets based on the inference results of the patches.

All data to which annotated data is not mapped in the DB 20 may be candidate data for annotation, or a subset of all data to which annotated data is not mapped in the DB 20 may be candidate data for annotation. For example, the candidate data for secondary training data may be 99,000 medical images remaining after being used as primary training data among 100,000 medical images, or a certain amount (e.g., 10,000 medical images) of medical images sampled from among 99,000 medical images. When the amount of target data to be selected is determined, the selector 300 may randomly extract K pieces of medical data based on the selection policy or extract the top K pieces of medical data satisfying a specific condition among the medical data based on the selection policy.

For example, when the selector 300 determines to use selection policy 1 of extracting more medical data classified in a specific class medical data inferred as a specific class may be selected more than medical data inferred as different classes based on the inference result for the annotation candidate data.

The selector 300 may request an annotation operation for target data to the annotation operation processor 400. While selecting target data for annotation based on a selection policy, the selector 300 may add a predetermined number of randomly extracted medical data to the target data. The inclusion of randomly extracted annotation targets with diverse distributions can be advantageous for model learning.

The annotation operation processor 400 may request an annotation job for target data to an annotator, acquire annotated data for the target data, and store the annotated data in the DB 20.

After acquiring the annotated data of the target data selected for the next training, the trainer 200 retrains the AI model 100 based on the new training data. The trainer 200 may utilize both new training data and existing training data to retrain the AI model 100.

Referring to FIG. 2, the selecting apparatus 10 may repeatedly determine a selection policy for medical data based on the training performance of the current AI model 100 and select annotation targets for the next training according to the selection policy until the training performance of the AI model 100 exceeds the reference. The selecting apparatus 10 may evaluate the training performance of the current AI model 100, and when the next training is required, the selecting apparatus 10 may select target data for annotation based on the training performance and then re-trains the current AI model 100 using the target data with the annotated data. The total number of training iterations (N) may be adjusted according to the training performance, and the number of target data for each training may also be adjusted according to the training performance. The selecting apparatus 10 may evaluate the training performance of the current AI model 100, and may terminate the training process of the AI model 100 when the no further training is necessary.

Rather than selecting annotation targets all at once from mass medical data (e.g., selecting 10,000 pieces out of 100,000 pieces), the selecting apparatus 10 may adaptively determine the amount of target data (e.g., 10,000 pieces out of 100,000 pieces) to be used for secondary training based on training performance of the AI model 100 trained with primary training data (e.g., 1,000 pieces out of 100,000 pieces). Next, the selecting apparatus 10 may determine the need for a third round of training based on the training performance of the AI model 100 which is trained using the secondary target data with the annotated data. If necessary, the selecting apparatus 10 may perform a step-by-step process to select third target data (e.g., selecting 20,000 pieces out of 100,000 pieces) to be used for the third round of training. The selecting apparatus 10 may first determine a selection policy for selecting mass training data based on a result of the AI model 100 trained using a small amount of data, before performing the training using mass training data. Therefore, the selecting apparatus 10 may efficiently select target data requiring annotation and improve the training performance of the current AI model 100. This approach may help to increase the training performance of the AI model while minimizing the annotation cost.

Each of FIGS. 3 to 6 is a flowchart of a method for selecting medical data for annotation according to an embodiment.

Figure 3:
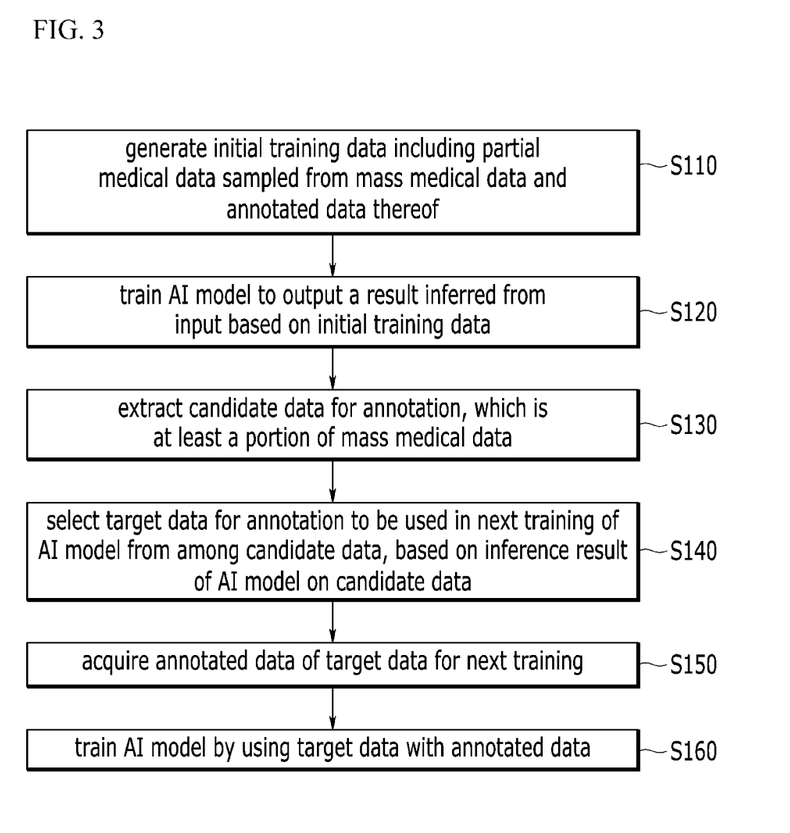
FIGS. 3 to 6 are flowcharts of a method for selecting medical data for annotation according to an embodiment.

Referring to FIG. 3, the selecting apparatus 10 generates initial training data including partial medical data sampled from mass medical data and annotated data thereof (S110). There may be various methods to sample annotation targets for initial training data. For example, the selector 300 may randomly sample 1000 medical images out of 100,000 medical images. Alternatively, the selector 300 may analyze a reading report associated with 100,000 medical images and sample medical images including information (e.g., a class name for classification) related to training of the AI model 100 in the reading report.

The selecting apparatus 10 trains the AI model 100 to output a result inferred from an input based on the initial training data (S120). Annotated data may be tagged to medical data so that the AI model 100 outputs a desired inference result from medical data. For example, the inference result may include a variety of classes, such as a class representing a cell type included in the image, a class representing a tissue type included in the image, a class representing quality of the image or an artifact affecting the quality, a class representing whether a region in the image is an ROI, a class representing immunity-related information, a class representing scores, such as TPS or CPS, and a class representing an expression level of a specific dye. In addition, the inference result may include a variety of classes, such as a class representing a type of lesion (e.g., pneumothorax, pulmonary nodule, lung cancer, tuberculosis, fracture, pneumonia, atelectasis, pulmonary consolidation, benign tumor in the breast, malignant tumor in the breast, breast cancer lesion, etc.), a class representing a type of organ (e.g., lung, stomach, esophagus, carina, diaphragm, etc.), a class representing a type of medical device, a class representing breast density, or a class representing the possibility of developing breast cancer in the future.

The selecting apparatus 10 extracts candidate data for annotation, which is at least a portion of mass medical data (S130).

The selecting apparatus 10 selects target data for annotation to be used in next training of the AI model from among the candidate data, based on the inference result of the AI model 100 on the candidate data (S140). The selecting apparatus 10 may determine a selection policy for selecting annotation targets from candidate data for the next training based on the current performance of the AI model 100. Then, the selecting apparatus 10 may select annotation targets corresponding to the selection policy from candidate data based on the inference result. Additionally, the selecting apparatus 10 may select target data based on the selection policy, and may add a predetermined number of randomly extracted medical data to the target data. At this time, the selecting apparatus 10 may determine the current selection policy to be the same as or different from a previous selection policy according to the training performance of the AI model 100.

The selecting apparatus 10 acquires annotated data of target data for the next training (S150).

The selecting apparatus 10 trains the AI model 100 by using the target data with the annotated data (S160). When annotated data is required for the next training of the AI model 100, the selecting apparatus 10 may repeat the annotation target selection process by proceeding to the operation S130.

Figure 4:
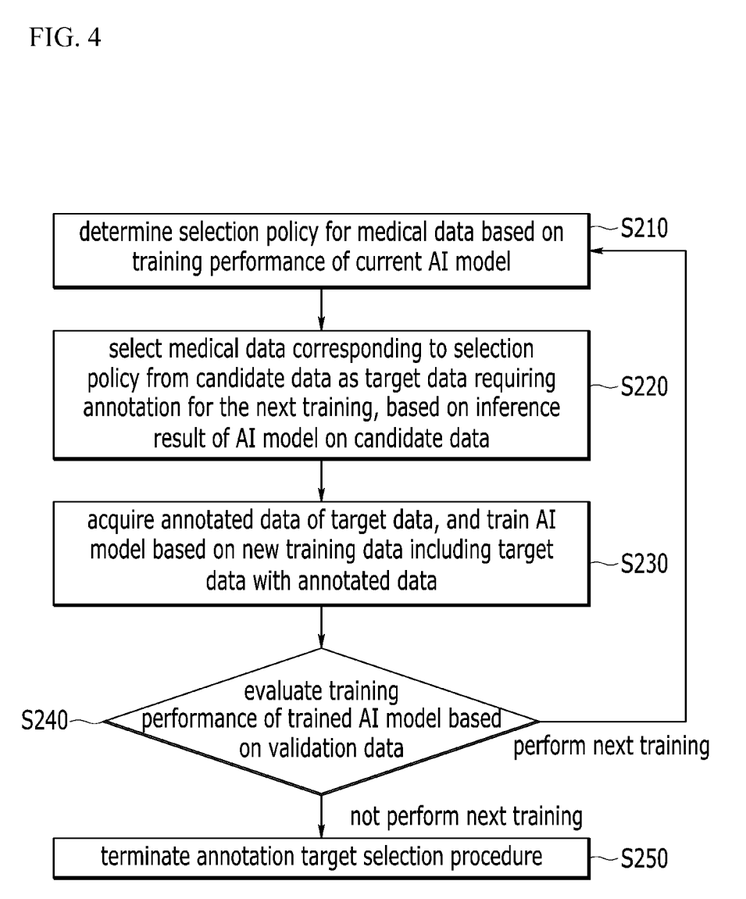

Referring to FIG. 4, the selecting apparatus 10 determines a selection policy for medical data based on the training performance of the current AI model 100 (S210). The selection policy may vary depending on the training performance of the current AI model 100 and tasks. For example, if classification accuracy of a specific class is below a reference, the selecting apparatus 10 may determine a selection policy that extracts medical data related to the specific class. This allows the current AI model 100 to appropriately classify the specific class in the next training, which had poor classification accuracy previously. The selection policy may specify the number of annotation targets to be selected. At this time, the selecting apparatus 10 may determine the current selection policy to be the same as or different from a previous selection policy according to the training performance of the AI model 100.

The selecting apparatus 10 selects medical data corresponding to a selection policy from candidate data, as target data requiring annotation for the next training, based on the inference results of the AI model 100 on the candidate data (S220). The selecting apparatus 10 may acquire inference results for candidate data by the AI model 100, and select medical data to be used as annotation targets based on the inference result of the candidate data, following a selection policy. In the mass medical data, all data without annotated data may be candidate data for annotation, or a certain amount of data among all data without annotated data may be candidate data. Meanwhile, the selecting apparatus 10 may select target data for annotation based on a selection policy, and may add a predetermined number of randomly extracted medical data to the target data.

The selecting apparatus 10 acquires annotated data of the target data, and trains the AI model 100 based on new training data that includes the target data with the annotated data (S230). The selecting apparatus 10 may retrain the AI model 100 by using both new training data and existing training data. Depending on the learning method, The AI model 100 may perform supervised learning using medical data with annotated data, or may perform unsupervised learning using medical data without annotated data as training data.

The selecting apparatus 10 evaluates the training performance of the trained AI model 100 based on the validation data (S240). The selecting apparatus 10 may acquire inference results on the validation data from the AI model 100, and evaluate training performance by comparing the inference results with annotated data (ground truth) associated with the validation data.

When the evaluation result indicates that the next training is unnecessary, the selecting apparatus 10 terminates the annotation target selection procedure (S250). On the other hand, when the evaluation result suggests that the next training is necessary, the selecting apparatus 10 may proceed to the annotation target selection operation S210 for the next training and repeat the annotation target selection and training. When the training performance of the AI model 100 falls below the reference, the selecting apparatus 10 may determine that the next training is necessary.

Figure 5:
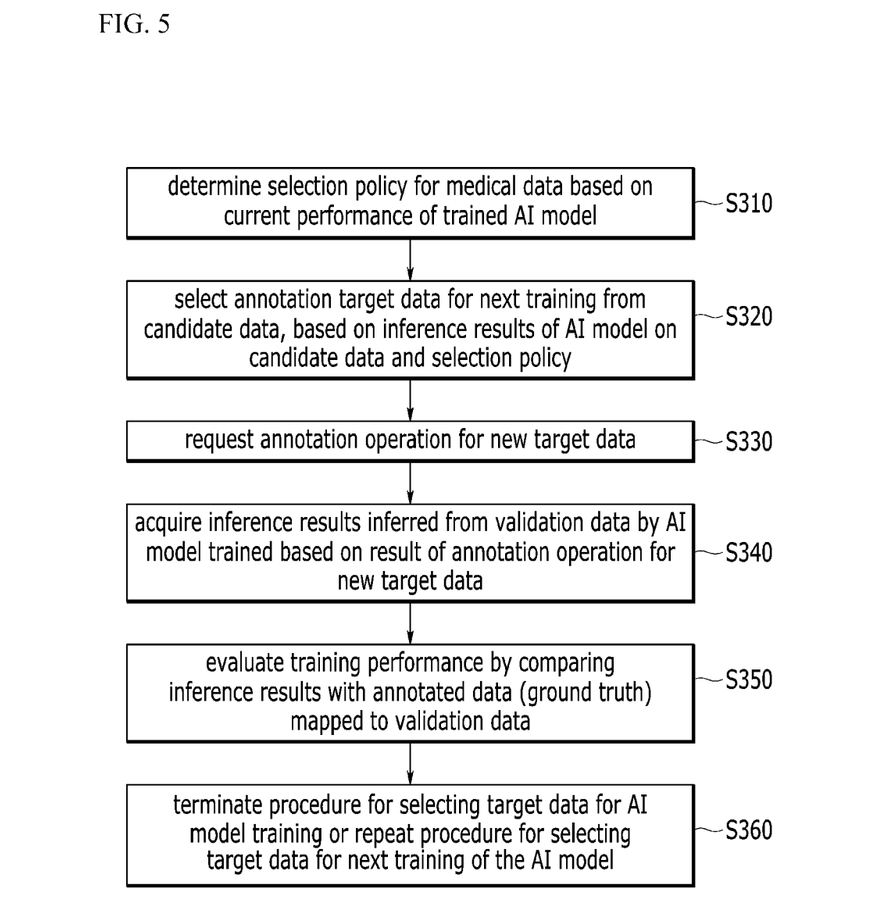

Referring to FIG. 5, the selecting apparatus 10 determines a selection policy for medical data based on the current performance of the trained AI model 100 (S310).

The selecting apparatus 10 selects annotation target data for the next training from candidate data, based on the inference results of the AI model 100 on the candidate data and a selection policy (S320). Meanwhile, the selecting apparatus 10 may select the target data based on a selection policy, and may add a predetermined number of randomly extracted medical data to the target data.

The selecting apparatus 10 requests an annotation operation for new target data (S330).

The selecting apparatus 10 acquires inference results that are inferred from validation data by the AI model 100 trained based on the result of the annotation operation for the new target data (S340).

The selecting apparatus 10 evaluates training performance by comparing the inference results with the annotated data (ground truth) mapped to the validation data (S350).

According to the evaluation result, the selecting apparatus 10 terminates the procedure for selecting target data for the AI model training or repeats the procedure for selecting target data for the next training of the AI model 100 (S360).

Figure 6:
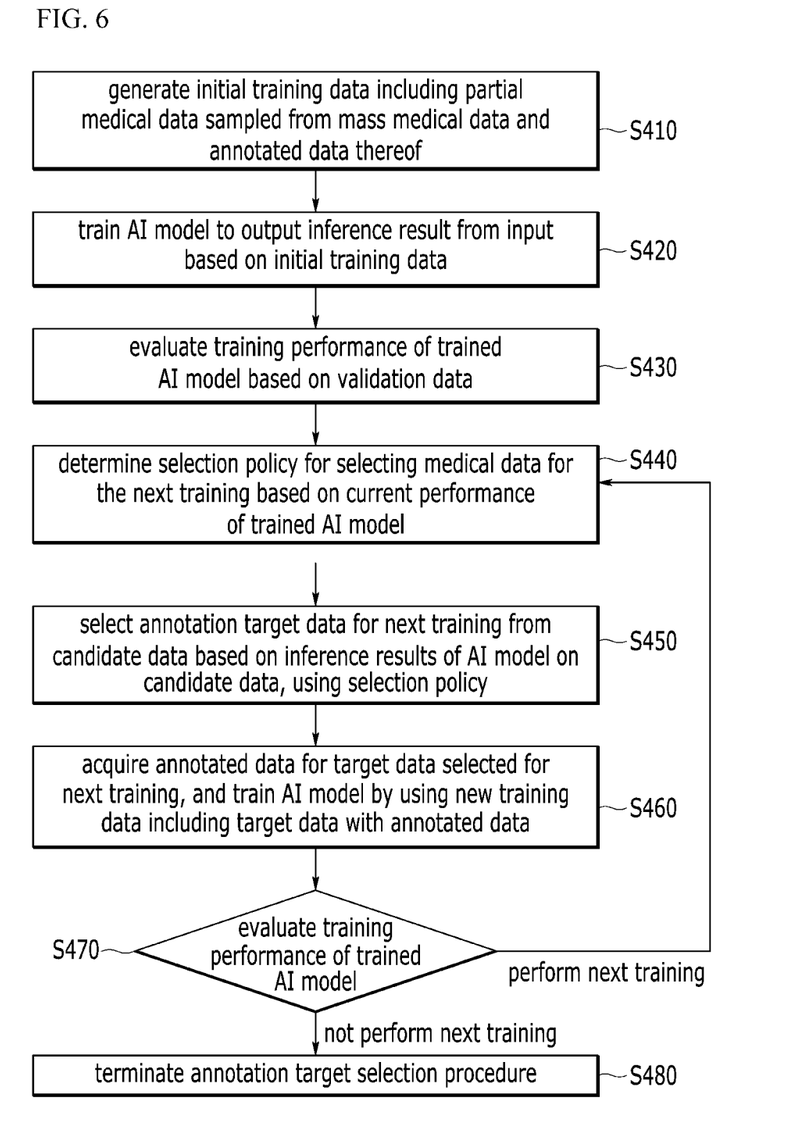

Referring to FIG. 6, the selecting apparatus 10 generates initial training data including partial data sampled from mass medical data and annotated data thereof (S410). There may be various methods for sampling annotation targets for initial training data. For example, the selector 300 may randomly sample 1000 medical images from among 100,000 medical images. Alternatively, the selector 300 may analyze a reading report associated with 100,000 medical images, and sample medical images associated with the reading report including information (e.g., a class name for classification) related to training of the AI model 100.

The selecting apparatus 10 trains the AI model 100 to output an inference result from an input based on initial training data (S420). Annotated data may be added and ensure that the AI model 100 outputs a desired inference result for medical data. For example, the inference result may include a class representing a cell type included in the image, a class representing a tissue type included in the image, a class representing quality of the image or an artifact affecting the quality, a class representing whether a region in the image is an ROI, a class representing immunity-related information, a class representing scores, such as TPS or CPS, and a class representing an expression level of a specific dye. In addition, the inference result may be include a class representing a type of lesion (e.g., pneumothorax, pulmonary nodule, lung cancer, tuberculosis, fracture, pneumonia, atelectasis, pulmonary consolidation, benign tumor in the breast, malignant tumor in the breast, breast cancer lesion, etc.), a class representing a type of organ (e.g., lung, stomach, esophagus, carina, diaphragm, etc.), a class representing a type of medical device, a class representing breast density, or a class representing the possibility of developing breast cancer in the future.

The selecting apparatus 10 evaluates the training performance of the trained AI model 100 based on the validation data (S430). The validation data may be generated to evaluate training performance of the AI model 100. Validation data may be extracted from mass medical data. Validation data may be included in partial data sampled in operation S410. The selecting apparatus 10 may obtain inference results of the AI model 100 on the validation data, and evaluate training performance by comparing the inference results with annotated data (ground truth) mapped to the validation data.

The selecting apparatus 10 determines a selection policy for selecting medical data for the next training based on the current performance of the trained AI model 100 (S440).

The selecting apparatus 10 selects annotation target data for the next training from candidate data based on the inference results of the AI model 100 on candidate data, using a selection policy (S450). Meanwhile, the selecting apparatus 10 selects target data based on a selection policy, and may add a predetermined number of randomly extracted medical data to the target data.

The selecting apparatus 10 acquires annotated data for target data selected for the next training, and trains the AI model 100 by using new training data including target data with the annotated data (S460).

The selecting apparatus 10 evaluates the training performance of the trained AI model 100 (S470). The selecting apparatus 10 may acquire inference results on the validation data from the AI model 100, and evaluate training performance by comparing the inference results with annotated data (ground truth) mapped to the validation data.

When the evaluation result does not require further training, the selecting apparatus 10 terminates the annotation target selection procedure (S480). When the evaluation result indicates the need for further training, the selecting apparatus 10 may proceed to the annotation target selection operation (S440) for the next training and repeat the annotation target selection and training.

Figure 7:
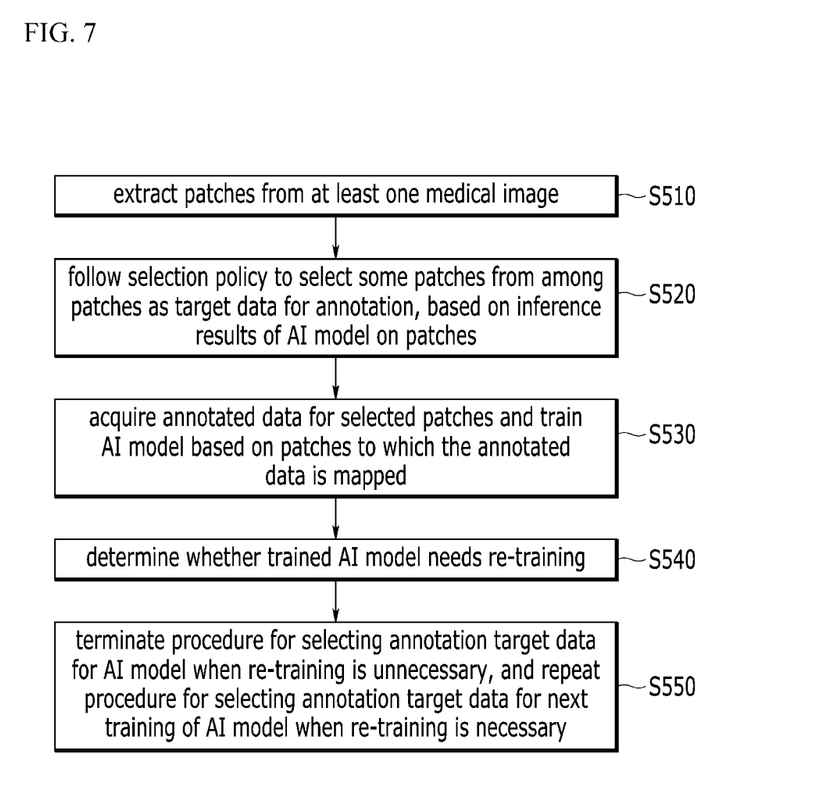
FIGS. 7 and 8 are respectively flowcharts of a method for selecting a patch image for annotation according to an exemplary embodiment.
Figure 8:
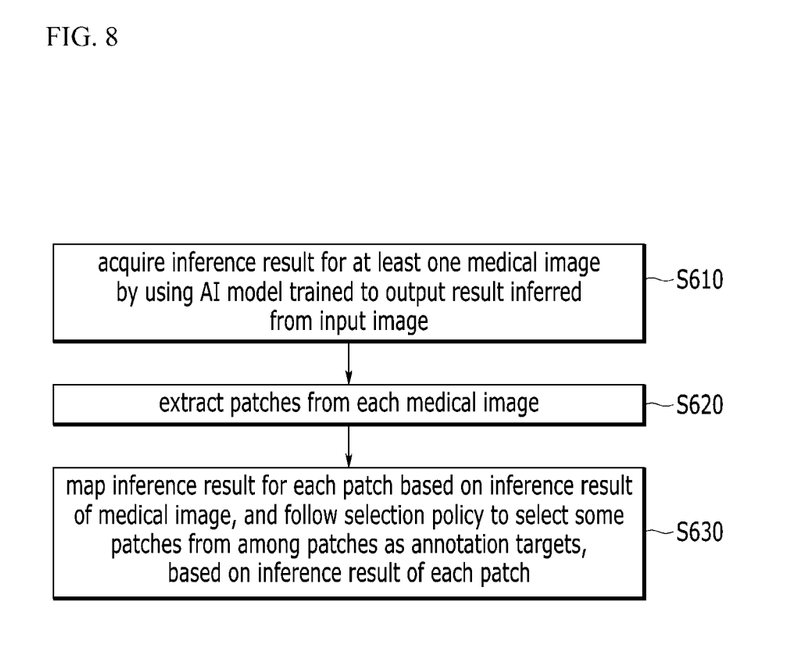

FIGS. 7 and 8 are respectively flowcharts of a method for selecting a patch image for annotation according to an exemplary embodiment.

Referring to FIG. 7, the selecting apparatus 10 extracts patches from at least one medical image (S510). The selecting apparatus 10 may extract patches such that the regions of interest overlap or do not overlap each other. The medical image may be, for example, a pathological image generated through WSI, but is not limited thereto.

The selecting apparatus 10 follows a selection policy to select some patches from among patches as target data for annotation, based on the inference results of the AI model 100 on the patches (S520). Meanwhile, the selecting apparatus 10 selects target data for annotation based on a selection policy, and may add randomly extracted patches to the target data.

The selecting apparatus 10 acquires annotated data for the selected patches and trains the AI model 100 based on the patches with the annotated data (S530).

The selecting apparatus 10 determines whether the trained AI model 100 needs re-training (S540).

The selecting apparatus 10 terminates the procedure for selecting annotation target data for the AI model when re-training is unnecessary, and repeats the procedure for selecting annotation target data for the next training of the AI model when re-training is necessary (S550).

Referring to FIG. 8, the selecting apparatus 10 acquires an inference result for at least one medical image by using the AI model trained to output a result inferred from an input image (S610). The medical image may be, for example, a pathological image generated through WSI, but is not limited thereto.

The selecting apparatus 10 extracts patches from each medical image (S620). The selecting apparatus 10 may extract patches such that the regions of interest overlaps or do not overlap each other.

The selecting apparatus 10 maps an inference result for each patch based on the inference result of the medical image, and follows a selection policy to select some patches from among patches as annotation targets, based on the inference result of each patch (S630). Meanwhile, the selecting apparatus 10 may select target data based on a selection policy, and may add randomly extracted patches to the target data.

In this case, the selecting apparatus 10 may train the AI model that outputs an inference result from the patch image using the inference result mapped to each patch. Also, the selecting apparatus 10 may acquire annotated data for the selected patches and retrain the AI model based on the patches to which the annotated data is mapped. As described above, when the AI model needs re-training, the selecting apparatus 10 may repeat the procedure for selecting annotation target data for the next training based on the inference results of the AI model for patches and training the AI model based thereon.

Figure 9:
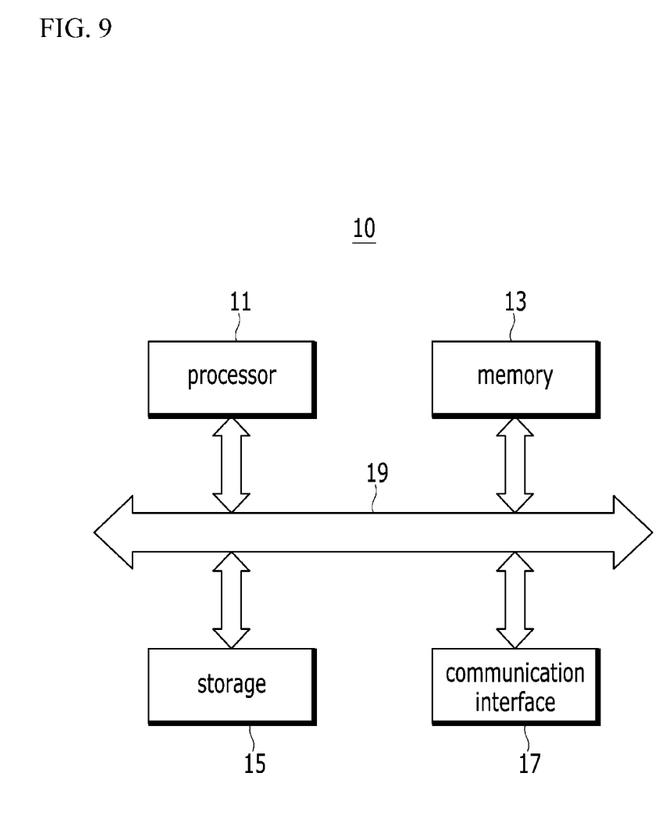
FIG. 9 is a hardware configuration diagram of an annotation selecting apparatus according to an embodiment.

FIG. 9 is a hardware configuration diagram of an annotation selecting apparatus according to an embodiment.

Referring to FIG. 9, the selecting apparatus 10 is a computing apparatus operated by one or more processors 11, and includes the processor 11, a memory 13 for loading a computer program executed by the processor 11, a storage 15 for storing computer programs and various data, a communication interface 17, and a bus 19 connecting them. In addition, the selecting apparatus 10 may further include various components.

The computer program may include instructions for the processor 11 to perform methods/operations according to various embodiments of the present invention, when loaded into the memory 13. That is, the processor 11 may perform methods/operations according to various embodiments of the present invention by executing instructions. The computer program includes a series of computer-readable instructions grouped together on a functional basis and is executed by a processor. The computer program may include instructions for performing the operations described in this disclosure.

The processor 11 controls the overall operation of each component of the annotation selecting apparatus 10. The processor 11 may include at least one of a central Processing Unit (CPU), a micro processing unit (MPU), a micro controller unit (MCU), a graphic processing unit (GPU), or any type of processor well known in the art of the present invention. Also, the processor 11 may perform an operation for at least one application or computer program for executing a method/operation according to various embodiments of the present invention.

The memory 13 stores various data, commands and/or information. The memory 13 may load one or more computer programs from the storage 15 to execute methods/operations according to various embodiments of the present invention. The memory 13 may be implemented as a volatile memory, such as RAM, but the technical scope of the present invention is not limited thereto.

Storage 15 may non-temporarily store computer programs. The storage 15 may include a non-volatile memory, such as read only memory (ROM), erasable programmable ROM (EPROM), electrically erasable programmable ROM (EEPROM), flash memory, or the like, a hard disk, a removable disk, or a certain type of computer-readable recording medium well known in the art to which the present invention pertains.

The communication interface 17 supports wired and wireless Internet communication of the selecting apparatus 10. Also, the communication interface 17 may support various communication methods other than Internet communication. To this end, the communication interface 17 may include a communication module well known in the art of the present invention.

The bus 19 provides communication between the components of the selecting apparatus 10. The bus 19 may be implemented in various types of buses, such as an address bus, a data bus, and a control bus.

The embodiments of the present invention described above are not implemented only through devices and methods, and may be implemented through a program that realizes functions corresponding to the configuration of the embodiments of the present invention or a recording medium on which the program is recorded.

While the embodiments of the present invention have been described in detail above, the scope of the present invention is not limited thereto, and various modifications and improvements of those skilled in the art using the basic concepts of the present invention defined in the following claims are also fall within the scope of the present invention.

What is claimed is:

1. An operating method of a medical data selecting apparatus operated by at least one processor, the operating method comprising:
   generating training data including partial images sampled from mass images corresponding to medical data and annotated data of the partial images;
   extracting candidate images for annotation from the mass images, the candidate images being at least a portion of the mass images and being images to which annotated data is not mapped;
   acquiring inference results that are inferred from the candidate images by an artificial intelligence (AI) model trained based on the training data; and
   selecting target images for annotation to be used in next training of the AI model, from among the candidate images based on the inference results;
   performing the next training of the AI model based on the target images and annotated data of the target images,
   wherein the selecting the target images for annotation includes:
      determining a selection policy for images to be used in the next training based on training performance of the AI model that has been trained in previous training; and
      selecting the target images for annotation corresponding to the selection policy from among the candidate images based on the inference results.

2. The operating method of claim 1, wherein the selection policy includes a policy of extracting images classified in a specific class more than images classified in other classes, the specific class having a classification accuracy equal to or lower than a reference.

3. The operating method of claim 1, further comprising:
   extracting validation data from the mass images, the validation data being at least a portion of the mass images; and
   evaluating the training performance of the AI model based on the validation data.

4. The operating method of claim 1, wherein the selecting the target images for annotation includes adding images randomly extracted from the mass images to the target images for annotation.

5. The operating method of claim 1, wherein the selecting the target images for annotation includes
   selecting images related to a specific class as the target images from among the candidate images based on the inference results.

6. The operating method of claim 1, wherein the generating the training data includes:
   analyzing a reading report associated with the mass images;
   sampling the partial images associated with the reading report including information related to training of the AI model; and
   acquiring the annotated data of the partial images to generate the training data.

7. The operating method of claim 1, wherein the mass images include images acquired by at least one medical imaging device, pathological images, or patch images extracted from a medical image.

8. An operating method of a medical data selecting apparatus operated by at least one processor, the operating method comprising:
   repeating a process including:
      determining a selection policy for images corresponding to medical data based on training performance of a current artificial intelligence (AI) model,
      selecting annotation target images to be used in next training corresponding to the selection policy from among candidate images for annotation, based on inference results that are inferred from the candidate images by the current AI model, the candidate images being at least a portion of the mass images and being images to which annotated data is not mapped, and
      training the current AI model based on annotated data acquired for the annotation target images; and
   terminating the process when the next training of the current Al model is not performed,
   wherein the selecting the annotation target images includes:
      determining a selection policy for images based on training performance of the current AI model that has been trained in previous training; and
      selecting the annotation target images corresponding to the selection policy from among the candidate images based on the inference results.

9. The operating method of claim 8, wherein the repeating includes:
   extracting validation data from the mass images, the validation data being at least a portion of the mass images; and
   evaluating the training performance of the current AI model based on the validation data.

10. The operating method of claim 8, wherein the process further includes adding images randomly extracted from the mass images to the annotation target images.

11. The operating method of claim 8, wherein the process further includes determining the selection policy to be a same as or different from a selection policy for the previous training based on the training performance of the current AI model.

12. The operating method of claim 8, wherein the current AI model includes an initial model trained based on partial images sampled from the mass images and annotated data of the partial images, or a model obtained by retraining the initial model based on the process.

13. The operating method of claim 8, wherein the mass images include images acquired by at least one medical imaging device, pathological images, or patch images extracted from a medical image.

14. A medical data selecting apparatus, the medical data selecting apparatus comprising:
   an artificial intelligence (AI) model trained to output an inference result that is inferred from an input based on training data; and
   at least one processor configured to:
      extract candidate images for annotation from mass images corresponding to medical data, the candidate images being at least a portion of mass images and being images to which annotated data is not mapped,
      acquire inference results that are inferred from the candidate images by the AI model,
      select annotation target images to be used in next training of the AI model from among the candidate images based on the inference results,
      acquire annotated data of the annotation target images to be used in the next training of the AI model, and
      perform the next training of the AI model based on the annotation target images and the annotated data,
   wherein the at least one processor is further configured to:

determine a selection policy for images to be used the next training based on training performance of the AI model that has been trained in previous training; and select the annotation target images corresponding to the selection policy from among the candidate images based on the inference results.

15. The medical data selecting apparatus of claim 14, wherein the at least one processor is further configured to repeat a process of selecting the annotation target images to be used in the next training based on the inference results of the AI model when the next training of the AI model is required.

16. The medical data selecting apparatus of claim 14, wherein the at least one processor is further configured to determine the selection policy to be a same as or different from a selection policy for the previous training based on the training performance of the AI model.

17. The medical data selecting apparatus of claim 14, wherein the at least one processor is further configured to add images randomly extracted from the mass images to the annotation target images.

18. The medical data selecting apparatus of claim 14, wherein the mass images include images acquired by at least one medical imaging device, pathological images, or patch images extracted from a medical image.

* * * * *